: 3,263,545
SLITTING TOOL
Berthold Leibinger, Stuttgart-Weilimdorf, and Eugen
Herb, Ditzingen, Wurttemberg, Germany, assignors to
Trumpf & Co., Stuttgart-Weilimdorf, Germany
Filed Jan. 14, 1964, Ser. No. 337,581
Claims priority, application Germany, Jan. 15, 1963,
T 23,331
5 Claims. (Cl. 83—528)

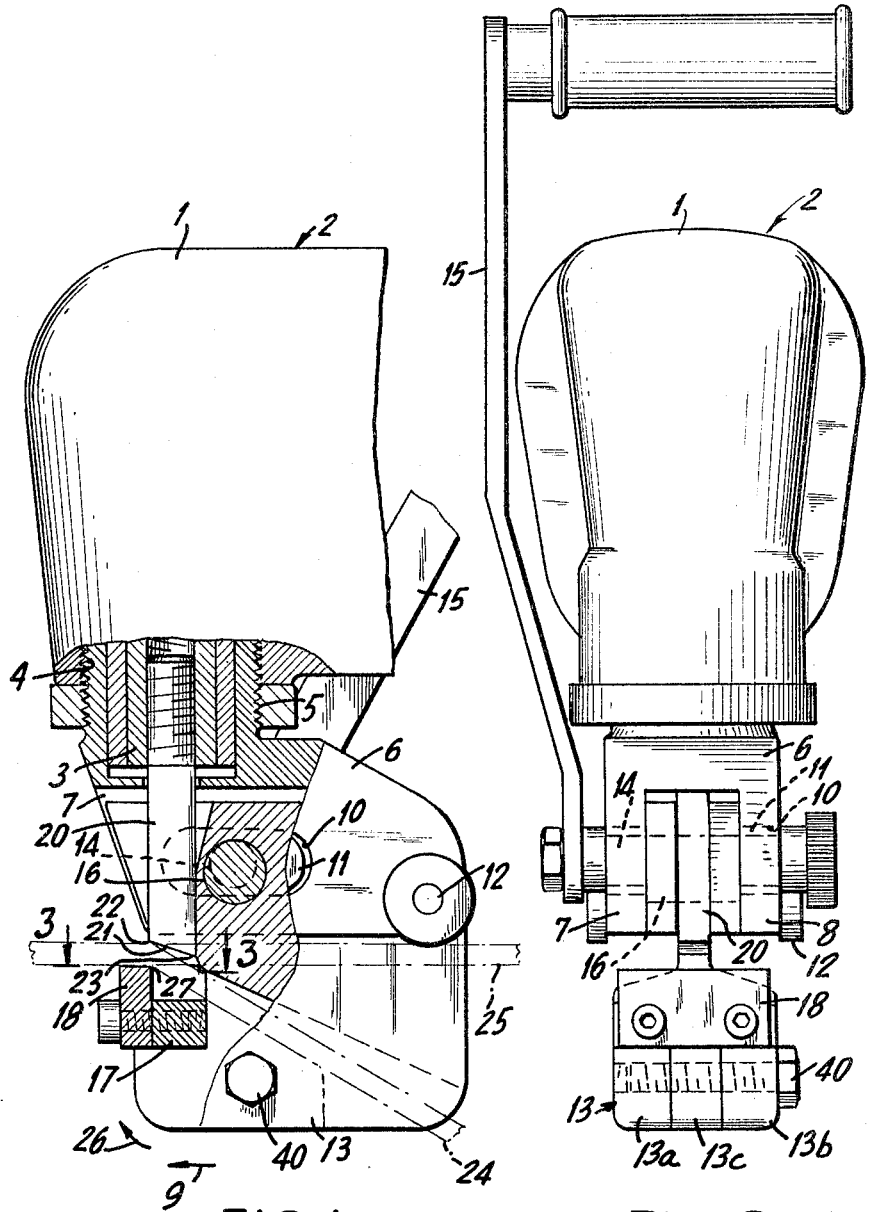

This invention relates in general to cutting tools, and in particular to a new and useful slitting tool for metal, plastic and the like, which includes a reciprocating cutter which cooperates with a die or knife means carried on a matrix, and wherein the matrix is adjustably mounted for shifting the knife means thereon in respect to the die.

In a slitting tool of the type with which the present invention is concerned, a long continuous chip is formed during the operation which interferes with the working operation and must therefore be cut off. In stationary machines, the stroke of the die is generally changed so that its higher front cutting edge cooperates with a front cross knife for cutting off the chip. The devices necessary for changing the stroke of the die are relatively expensive, however, and may not be used in hand slitting tools.

In accordance with the present invention, there is provided a slitting tool which includes an upper portion or head accommodating a vertically reciprocating ram carrying a cutting die and with a matrix connected to the upper portion which carries cutting knife means which cooperate with the moving die. The front cutting edge of the die is made higher than the rear edge and the stroke of the die is such that it normally does not cooperate with a cross knife carried by the matrix. In accordance with the inventive feature the matrix is made adjustable in directions corresponding to the direction of stroke movement of the die to selectively effect cooperation of the cross knife therewith.

In a preferred arrangement the matrix is pivotally mounted in respect to the upper portion of the tool which carries the reciprocating die. In the normal operation the matrix is positioned so that the die does not cooperate with the knife means carried by the matrix to cut the chip off. However, if the chip is to be cut off, it is only necessary to pivot the matrix so that its position is changed in respect to the stroke of the die to cause the front cutting edge of the die to come close enough to the die during its reciprocation to cut the chip off. By pivotally mounting the matrix in a matrix holder formed as a lower extension of the tool's upper housing which accommodates the reciprocating die, it is possible to obtain a good support of the matrix while permitting its adjustment in relation to the stroke of the die by a simple pivotal movement.

The device advantageously includes an upper housing or head in which the die is reciprocated which carries a depending yoke or forked member on which a matrix is pivotally suspended. A lever connected to the matrix permits its pivotal movement so as to change the forward portion thereof which carries two knives, one arranged in a cutting direction and one in a cross direction which may be brought either further upwardly toward the reciprocating die or moved downwardly away therefrom. Thus, a chip can be cut off during the operation merely by actuating the handle lever to raise the knives so that the forward cutting edge of the die will come closer to the cross cutting knife carried by the matrix during the stroke of the die.

Because the chip can be cut off easily during operation, the slitting tool according to the invention is particularly suitable for disengaging metal plates. Conveyance of the work piece to the striking shears or cutting arms is therefore not necessary, and large metal plates can be separated with the hand slitting tool.

Accordingly, it is an object of this invention to provide an improved cutting tool.

A further object of the invention is to provide a cutting tool or slitting tool for metal, plastic and the like, having a matrix with knife means including a knife extending in a cross-direction which cooperates with a cutting die with a reciprocating ram, the matrix being carried so that it is adjustable relative to the die for the purpose of shifting the position of the knife means in the matrix in respect to the operating stroke of the die.

A further object of the invention is to provide a cutting tool which includes a head portion having a depending supporting yoke threadably connected thereto which pivotally supports a matrix and wherein the matrix is provided with a cross knife which cooperates with the inner edge of an oblique cutting surface of a reciprocating die, and wherein a hand lever is provided on the matrix for pivoting the matrix on the supporting member in order to shift the knife of the matrix in respect to the cutting edge of the reciprocating die.

A further object of the invention is to provide a tool which is simple in design, rugged in construction and economical to manufacture.

The various features of novelty which characterize the invention are pointed out with particularity in the claims annexed to and forming part of this specification. For a better understanding of the invention, its operating advantages and specific objects attained by its use, reference should be had to the accompanying drawings and descriptive matter in which there is illustrated and described preferred embodiments of the invention.

In the drawings:

FIG. 1 is a partially side elevational and transverse sectional view of a hand slitting tool constructed in accordance with the invention;

FIG. 2 is a front view of the device indicated in FIG. 1; and

FIG. 3 is a partial sectional view taken along the line 3—3 of FIG. 1.

Referring to the drawings in particular, the invention embodied therein comprises a slitting tool generally designated 2 which includes an upper portion or head 1 carrying means (not shown) for reciprocating a ram 3 vertically. The tool is advantageously electrically driven with the electrical motor carried in the head 1. The head 1 is provided with a lower internal recess with a female thread 4 which is adapted to receive the male thread 5 of a forked clip member or support 6. The forked clip 6 is provided with downwardly extending arm portions 7 and 8 which are provided with oblong slots 10 which are elongated in a direction parallel to a cutting direction indicated by the arrow 9. A displaceable sliding block 11 is slideably mounted within each slot 10. The blocks 11 carry an axle member or rod 14 which extends through each arm portion 7 and 8. A lever 15 is secured to one end of the rod 14. The rod 14 is provided with an eccentric central portion 16 which is rotatably journalled in a bore of a matrix member or holder 13.

The matrix 13 is displaceably mounted on the support 6 by means of a detachable axle or supporting rod 12. The matrix comprises outer plate members 13a and 13b and a central plate member 13c, which are secured together by a bolt 40. An upper extension of the central plate 13c carries the eccentric portion 16. The forward portion of the matrix 13 carries knife means comprising two main knives, a longitudinal knife means 17 extending in the cutting direction and a cross or transverse knife means 18 which extends transverse to the cutting direction. A cutter or cutting member 20 is threaded into the ram 3 and reciprocates therewith. The cutter 20 is made with an oblique cutting edge 21 which cooperates with one or both of the longitudinal and transverse cutting knife means comprising the cutting knives 17 and 18 which are carried by the matrix 13.

The matrix 13 with the cutting knives 17 and 18 cooperates with the cutting member 20 in an adjustable manner. The cutting member 20 normally reciprocates upwardly and downwardly to cooperate with the longitudinal knife means 17 to slit a strip from a work piece such as the work piece 25 indicated in dot and dash lines. The front cutting edge 22 of the cutting member is higher than the rear cutting edge 23, and the normal stroke of the cutting member 20 is such that the front cutting edge 22 does not act with the cross knife means 18 to completely sever the continuously formed chip 24 during the cutting operation on the work piece 25. However, when the chip 24 is to be cut off, it is possible, in accordance with the invention, to merely turn the hand lever 15. Since the axle 14 to which the handle lever 15 is connected, is provided with a central eccentric 16, the matrix holder 13 is rotated about the supporting axle 12 in the direction of the arrow 26 in FIG. 1 in order to cause the cross knife means 18 to be moved higher. The positioning of the cross knife means 18 upwardly in this manner causes the cutting member 20 to come close enough to the cutting edge 27 of the cross knife 18 to cause the chip 24 to be cut off.

While specific embodiments of the invention have been shown and described in detail to illustrate the application of the principles of the invention, it will be understood that the invention may be embodied otherwise without departing from such principles.

What is claimed is:

1. A cutting tool for cutting materials such as metal, plastic and the like, comprising a head, a cutting member carried by said head and being reciprocable therein, a matrix movably supported from said head, cutting knife means carried by said matrix for positioning in alignment with said cutting member for cutting materials, said cutting knife means including transverse cutting knife means and longitudinal cutting knife means, said cutting member having side edges which cooperate with said longitudinal cutting knife means to cut away a strip of material and having a forward edge which does not come close enough to the transverse cutting knife carried by said matrix during the reciprocation of said cutting die to cause the complete severance of the chip material being cut in a first operating position of said matrix, said matrix being movable on said support member to bring said matrix to a second operative position at which said transverse cutting knife comes close enough to the forward cutting edge of said cutting die during reciprocation thereof to sever the material being cut in a second operative position.

2. A device according to claim 1, including a lever connected to said matrix for shifting said matrix about its pivotal connection of said support member.

3. A material slitting tool comprising a head, a cutting die member reciprocable in said head, a matrix movably supported from said head and including a portion supported below said cutting die member forming an opening with said cutting die member for receiving the material to be slit therebetween, longitudinal cutting means carried on said matrix below said cutting die member, transverse cutting means disposed in alignment below the leading edge of said cutting die member in respect to the cutting direction, said cutting die member having a stroke when said matrix is in a first operating position sufficient to effect slitting of the material by the cooperative action of said cutting die member and said longitudinal cutting means but not sufficient to cooperate with said transverse cutting means, and means for moving said matrix to shift said transverse cutting means to a second operative position at which said transverse cutting means is moved to a position in which it cooperates with said cutting die member for cutting away the chip which is formed.

4. A manual material slitting tool comprising a head, a cutting die member reciprocable in said head, a matrix movably supported from said head and including a portion supported below said cutting die member forming an opening with said cutting die member for receiving the material to be slit therebetween, longitudinal cutting means carried on said matrix below said cutting die member, transverse cutting means disposed in alignment below the leading edge of said cutting die member in respect to the cutting direction, said cutting die member having a stroke when said matrix is in a first operating position sufficient to effect slitting of the material by the cooperative action of said cutting die member and said longitudinal cutting means but not sufficient to cooperate with said transverse cutting means, and means for moving said matrix to shift said transverse cutting means to a second operative position at which said transverse cutting means is moved to a position in which it cooperates with said cutting die member for cutting away the chip which is formed, said matrix including a vertical portion extending through the plane of the material which is to be cut which is of a thickness less than the width of the slit to be cut in the material to permit the slitting tool to be passed across the material.

5. A manual material slitting tool comprising a head, a cutting die member reciprocable in said head, a matrix pivotally supported from said head and including a portion supported below said cutting die member forming an opening with said cutting die member for receiving the material to be slit therebetween, longitudinal cutting means carried on said matrix below said cutting die member, transverse cutting means disposed in alignment below the leading edge of said cutting die member in respect to the cutting direction, said cutting die member having a stroke when said matrix is in a first operating position sufficient to effect slitting of the material by the cooperative action of said cutting die member and said longitudinal cutting means but not sufficient to cooperate with said transverse cutting means, and means for moving said matrix to shift said transverse cutting means to a second operative position at which said transverse cutting means is moved to a position in which it cooperates with said cutting die member for cutting away the chip which is formed, said cutting die member having a bevelled lower face to form a leading edge which does not come close enough to the transverse cutting knife means carried by said matrix during reciprocation of said cutting die member when in a first operative position but which will be positioned close enough to said transverse cutting knife member when said matrix is moved to a second operative position.

References Cited by the Examiner

UNITED STATES PATENTS

| | | | |
|---|---|---|---|
| 976,877 | 11/1910 | Heinss | 83—564 |
| 1,857,167 | 5/1932 | Steindorff | 83—563 |
| 2,384,130 | 9/1945 | Pell | 83—564 |
| 3,038,362 | 6/1962 | Porterfield | 83—564 |
| 3,077,134 | 2/1963 | Ronick | 83—563 |
| 3,123,290 | 3/1964 | Rabinow | 234—115 |
| 3,146,653 | 9/1964 | Kuts | 83—558 |

FOREIGN PATENTS 692,708   6/1953   Great Britain.

WILLIAM W. DYER, Jr., *Primary Examiner.*

J. L. SEITCHIK, L. B. TAYLOR, *Assistant Examiners.*